US011275429B2

(12) United States Patent
Singh et al.

(10) Patent No.: US 11,275,429 B2
(45) Date of Patent: Mar. 15, 2022

(54) REDUCING POWER CONSUMPTION OF A DATA CENTER UTILIZING REINFORCEMENT LEARNING FRAMEWORK

(71) Applicant: Dell Products L.P., Round Rock, TX (US)

(72) Inventors: Ashutosh Singh, Austin, TX (US); Michael David Shepherd, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 133 days.

(21) Appl. No.: 16/915,133

(22) Filed: Jun. 29, 2020

(65) Prior Publication Data

US 2021/0405727 A1    Dec. 30, 2021

(51) Int. Cl.
*G06F 1/32*        (2019.01)
*G06F 1/329*       (2019.01)
(Continued)

(52) U.S. Cl.
CPC ........... *G06F 1/329* (2013.01); *G05B 13/024* (2013.01); *G05B 13/0265* (2013.01); *G05D 23/1917* (2013.01)

(58) Field of Classification Search
CPC ... G06F 1/329; G05B 13/024; G05B 13/0265; G05D 23/1917
See application file for complete search history.

(56) References Cited

U.S. PATENT DOCUMENTS 10,970,649 B2 *  4/2021  Nag ................... G06N 7/043
2009/0235097 A1  9/2009  Hamilton et al.
(Continued)

FOREIGN PATENT DOCUMENTS

CN    111555907 A  *  8/2020  ............... G06F 1/32
SG    10201808290 A1 *  4/2019

OTHER PUBLICATIONS

Deepmind, "DeepMind AI Reduces Google Data Centre Cooling Bill by 40%," https://deepmind.com/blog/article/deepmind-ai-reduces-google-data-centre-cooling-bill-40, Jul. 20, 2016, 6 pages.
(Continued)

*Primary Examiner* — Chun Cao
(74) *Attorney, Agent, or Firm* — Ryan, Mason & Lewis, LLP

(57) ABSTRACT

An apparatus comprises a processing device configured to obtain first parameters characterizing an operating state of information technology (IT) resources of a data center and second parameters characterizing an operating state of cooling systems of the data center, to determine an overall operating state of the data center by aggregating the first and second parameters, to identify a power consumption profile based on the overall operating state, and to perform a joint training of first and second reinforcement learning agents based on the overall operating state and the power consumption profile. The processing device is also configured to generate first controls for the heterogeneous IT resources utilizing the first reinforcement learning agent and second controls for the cooling systems utilizing the second reinforcement learning agent, the first and second controls being configured to reduce power consumption while maintaining specified performance benchmarks for workloads executing in the data center.

20 Claims, 11 Drawing Sheets

(51) Int. Cl.
*G05B 13/02* (2006.01)
*G05D 23/19* (2006.01)

(56) References Cited

U.S. PATENT DOCUMENTS

| | | |
|---|---|---|
| 2010/0076607 A1 | 3/2010 | Ahmed et al. |
| 2011/0055604 A1 | 3/2011 | Jackson |
| 2013/0103218 A1 | 4/2013 | Das et al. |
| 2014/0040899 A1 | 2/2014 | Chen et al. |
| 2015/0169026 A1* | 6/2015 | Bodas .................. G06F 1/3206 713/320 |
| 2020/0279149 A1* | 9/2020 | Kim ....................... G06N 20/00 |

OTHER PUBLICATIONS

M. Brown et al., "ReRack: Power Simulation for Data Centers with Renewable Energy Generation," ACM Sigmetrics, vol. 39, No. 3, Dec. 2011, 5 pages.

R. Lowe et al., "Multi-Agent Actor-Critic for Mixed Cooperative-Competitive Environments," arXiv:1706.02275, Mar. 14, 2020, 16 pages.

* cited by examiner

REDUCING POWER CONSUMPTION OF A DATA CENTER UTILIZING REINFORCEMENT LEARNING FRAMEWORK

FIELD

The field relates generally to information processing, and more particularly to techniques for managing power consumption.

BACKGROUND

Data centers typically comprise a variety of different types of information technology resources, such as various compute, storage and network resources. Data centers also typically include cooling systems, such as air conditioning units, that are placed at various locations in a facility housing the information technology resources of the data center and are responsible for maintaining set temperatures of portions of the facility that house the information technology resources of the data center. The overall power consumption by a particular data center may be significant, and power consumption by cooling systems of the data center may represent a large portion of the cost of operating the data center. Accordingly, there is a desire to save costs of operating data centers through achieving efficiencies of both the cooling systems and the orchestration of compute distribution throughout the data centers.

SUMMARY

Illustrative embodiments of the present invention provide techniques for reducing power consumption of a data center while maintaining specified performance benchmarks utilizing a reinforcement learning framework.

In one embodiment, an apparatus comprises at least one processing device comprising a processor coupled to a memory. The at least one processing device is configured to perform the steps of obtaining a first set of parameters characterizing an operating state of a plurality of heterogeneous information technology resources of a data center and a second set of parameters characterizing an operating state of one or more cooling systems of the data center, determining an overall operating state of the data center by aggregating the first and second sets of parameters, identifying a power consumption profile of the data center based at least in part on the determined overall operating state of the data center, and performing a joint training of a first set of one or more reinforcement learning agents and a second set of one or more reinforcement learning agents based at least in part on the determined overall operating state of the data center and the identified power consumption profile. The at least one processing device is also configured to perform the step of generating a first set of controls for the plurality of heterogeneous information technology resources of the data center utilizing the trained first set of one or more reinforcement learning agents and a second set of controls for the one or more cooling systems of the data center utilizing the trained second set of one or more reinforcement learning agents, the first and second sets of controls being configured to reduce power consumption by the data center while maintaining specified performance benchmarks for workloads executing in the data center. The at least one processing device is further configured to perform the step of controlling operation of the data center based at least in part on the first and second sets of controls.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
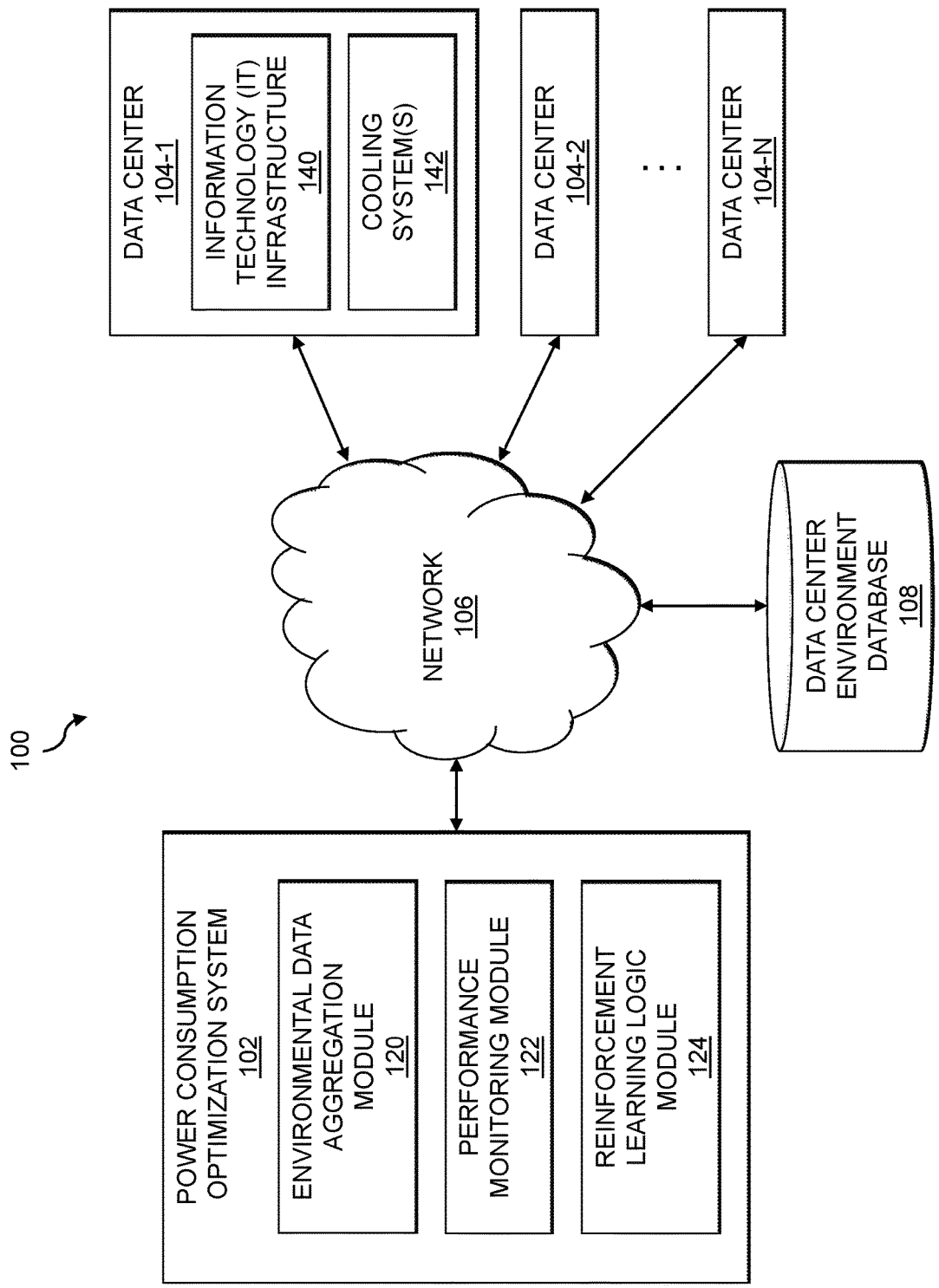
FIG. 1 is a block diagram of an information processing system for reducing power consumption of a data center while maintaining specified performance benchmarks utilizing a reinforcement learning framework in an illustrative embodiment of the invention.

FIG. 1 shows an information processing system 100 configured in accordance with an illustrative embodiment. The information processing system 100 is assumed to be built on at least one processing platform and provides functionality for reducing power consumption of data centers while maintaining specified performance benchmarks utilizing a reinforcement learning framework. The information processing system 100 includes a power consumption optimization system 102 and a plurality of data centers 104-1, 104-2, . . . 104-N (collectively, data centers 104). The power consumption optimization system 102 and data centers 104 are coupled to a network 106. Also coupled to the network 106 is a data center environment database 108, which stores various information relating to operation of the data centers 104 as will be described in further detail below.

The power consumption optimization system 102 is configured to collect information characterizing the environment and performance of the data centers 104. The power consumption optimization system 102 utilizes such information for determining actions to take to optimize or at least improve power consumption by the data centers 104. Such actions may include, but are not limited to, adjusting controls of the cooling systems of one or more the data centers 104, performing load balancing for jobs, tasks or other workloads running on information technology (IT) infrastructure of one or more of the data centers 104, etc. In some embodiments, the power consumption optimization system 102 is provided as a service that may be subscribed to or otherwise utilized by different ones of the data centers 104. For example, a given one of the data centers 104 (e.g., data center 104-1) may sign up or register with the power consumption optimization system 102 so as to receive feedback regarding actions to take to improve its power consumption profile (e.g., to minimize or reduce power consumption while meeting expected performance benchmarks).

Although shown as external to the data centers 104 in FIG. 1, in some embodiments the power consumption optimization system 102 may be implemented at least in part within one or more of the data centers 104. For example, the power consumption optimization system 102 may deploy software agents or monitoring tools within a given one of the data centers (e.g., data center 104-1). Such deployed agents or monitoring tools may gather information from the IT infrastructure 140 and cooling systems 142 of the data center 104-1, and provide such information (or metrics derived therefrom) back to the power consumption optimization system 102 for analysis. The power consumption optimization system 102 may analyze the received information to determine actions to take within the data center 104-1 to improve or optimize power consumption, and to generate and provide alerts or notifications detailing such actions back to the deployed agents or monitoring tools at the data center 104-1.

In the present embodiment, alerts or notifications generated by the power consumption optimization system 102 are provided over network 106 to the data center 104-1, or to a system administrator, IT manager, or other authorized personnel via one or more deployed agents or monitoring tools. Such deployed agents or monitoring tools, also referred to herein host agents, may be implemented via one or more client devices or by other computing or processing devices associated with a system administrator, IT manager or other authorized personnel or users of the data center 104-1. Such devices can illustratively comprise mobile telephones, laptop computers, tablet computers, desktop computers, or other types of computers or processing devices configured for communication over network 106 with the power consumption optimization system 102. For example, a given host agent may comprise a mobile telephone equipped with a mobile application configured to receive alerts or notifications from the power consumption optimization system 102 (e.g., prompts to take actions for optimizing power consumption by the data center 104-1). The given host agent provides an interface for responding to such various alerts or notifications as described elsewhere herein.

It should be noted that a "host agent" as this term is generally used herein may comprise an automated entity, such as a software entity running on a processing device. Accordingly, a host agent need not be a human entity. In addition, the term "user" herein is intended to be broadly construed so as to encompass numerous arrangements of human, hardware, software or firmware entities, as well as combinations of such entities.

The use of such host agents, however, is optional. In some embodiments, the actions recommended by the power consumption optimization system 102 may be automatically accepted and implemented in the data center 104-1 without requiring host agent review or approval. In such cases, however, host agents may still be utilized to inform system administrators, IT managers or other authorized personnel regarding the actions that have been taken in the data center 104-1 as recommended by the power consumption optimization system 102.

The power consumption optimization system 102 includes an environmental data aggregation module 120, a performance monitoring module 122 and a reinforcement learning logic module 124 that provide functionality for generating recommended actions for optimizing or improving power consumption by the data centers 104 as will be described in further detail below.

Each of the data centers 104 is assumed to comprise IT infrastructure and one or more cooling systems. For example, FIG. 1 shows data center 104-1 including IT infrastructure 140 and one or more cooling systems 142. The IT infrastructure 140 may comprise physical and virtual computing resources. Physical computing resources may include physical hardware such as servers, storage systems, networking equipment, Internet of Things (IoT) devices, other types of processing and computing devices, etc. Virtual computing resources may include virtual machines (VMs), containers, etc. The cooling systems 142 may comprise various heating, ventilation and air conditioning (HVAC) systems and equipment. In some embodiments, it is assumed that the cooling systems 142 comprise air conditioning systems, such as multiple air conditioning units that are distributed across a facility housing the IT infrastructure 140 of the data center 104-1. Although not shown in FIG. 1, other ones of the data centers 104-2 through 104-N are assumed to similarly comprise IT infrastructure and one or more cooling systems in a manner similar to that described with respect to data center 104-1.

In some embodiments, each of the data centers 104 comprises IT infrastructure that is associated with a particular company, organization or other enterprise. Thus, each data center 104 may be referred to as an enterprise data center. In other embodiments, multiple ones of the data centers 104 are associated with a same enterprise, such that at least a portion of the system 100 may also be referred to herein as collectively comprising an "enterprise." Numerous other operating scenarios involving a wide variety of different types and arrangements of data centers are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The data center environment database 108, as discussed above, is configured to store and record information relating to the operating environment of the data centers 104. Such information may include telemetry data, utilization and performance metrics, state and reward information, action recommendations, etc. Such information may be utilized by the power consumption optimization system 102, such as in training one or more machine learning algorithms (e.g., reinforcement learning logic agents) used to generate new action recommendations. In some embodiments, one or more of the storage systems utilized to implement the data center environment database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the power consumption optimization system 102, as well as to support communication between the power consumption optimization system 102 and other related systems and devices not explicitly shown.

The power consumption optimization system 102 in the FIG. 1 embodiment is assumed to be implemented using at least one processing device. Each such processing device generally comprises at least one processor and an associated memory, and implements one or more functional modules for controlling certain features of the power consumption optimization system 102, such as the environmental data aggregation module 120, the performance monitoring module 122 and the reinforcement learning logic module 124.

Functionality of the environmental data aggregation module 120, the performance monitoring module 122 and the reinforcement learning logic module 124 will now be described with respect to optimizing power consumption by the data center 104-1. It should be appreciated, however, that the modules 120, 122 and 124 may perform similar functionality for optimizing power consumption by other ones of the data centers 104-2 through 104-N.

The environmental data aggregation module 120 is configured to obtain a first set of parameters characterizing an operating state of a plurality of heterogeneous IT resources of the IT infrastructure 140 of the data center 104-1 and to obtain a second set of parameters characterizing an operating state of the cooling systems 142 of the data center 104-1. The environmental data aggregation module 120 is also configured to determine an overall operating state of the data center 104-1 by aggregating the first and second sets of parameters. The performance monitoring module 122 is configured to identify a power consumption profile of the data center based at least in part on the determined overall operating state of the data center.

The reinforcement learning logic module 124 is configured to perform a joint training of a first set of one or more reinforcement learning agents and a second set of one or more reinforcement learning agents based at least in part on the determined overall operating state of the data center and the identified power consumption profile. The reinforcement learning logic module 124 is also configured to generate a first set of controls for the plurality of heterogeneous IT resources of the data center 104-1 utilizing the trained first set of one or more reinforcement learning agents and a second set of controls for the one or more cooling systems 142 of the data center 104-1 utilizing the trained second set of one or more reinforcement learning agents. The first and second sets of controls are configured to reduce power consumption by the data center 104-1 while maintaining specified performance benchmarks for workloads executing in the data center 104-1. The reinforcement learning logic module 124 is further configured to control operation of the data center 104-1 based at least in part on the first and second sets of controls.

It is to be appreciated that the particular arrangement of the power consumption optimization system 102 and data centers 104 illustrated in the FIG. 1 embodiment is presented by way of example only, and alternative arrangements can be used in other embodiments. As discussed above, for example, the power consumption optimization system 102, or one or more portions thereof such as the environmental data aggregation module 120, the performance monitoring module 122 and the reinforcement learning logic module 124, may in some embodiments by implemented at least in part internal to one or more of the data centers 104. As another example, the functionality associated with the environmental data aggregation module 120, the performance monitoring module 122 and the reinforcement learning logic module 124 may be combined into one module, or separated across more than three modules with the multiple modules possibly being implemented with multiple distinct processors or processing devices.

At least portions of the environmental data aggregation module 120, the performance monitoring module 122 and the reinforcement learning logic module 124 may be implemented at least in part in the form of software that is stored in memory and executed by a processor.

It is to be understood that the particular set of elements shown in FIG. 1 for reducing power consumption of data centers 104 while maintaining specified performance benchmarks utilizing a reinforcement learning framework is presented by way of illustrative example only, and in other embodiments additional or alternative elements may be used. Thus, another embodiment may include additional or alternative systems, devices and other network entities, as well as different arrangements of modules and other components. It should be noted that reducing power consumption while maintaining specified performance benchmarks may, in some embodiments, include situations in which power consumption increases but does so while compute workload of a data center also increases. If the compute workload in the data center triples, as an example, but the power consumption only doubles using the techniques described herein, this is still considered reducing or improving power consumption of that data center. Various other examples are possible.

The power consumption optimization system 102, and other portions of the system 100, may in some embodiments be part of cloud infrastructure as will be described in further detail below. The cloud infrastructure hosting the power consumption optimization system 102 may also host any combination of one or more of the data centers 104 and the data center environment database 108.

The power consumption optimization system 102, and other components of the information processing system 100 in the FIG. 1 embodiment, are assumed to be implemented using at least one processing platform comprising one or more processing devices each having a processor coupled to a memory. Such processing devices can illustratively include particular arrangements of compute, storage and network resources.

The power consumption optimization system 102 and data centers 104 or components thereof may be implemented on respective distinct processing platforms, although numerous other arrangements are possible. For example, in some embodiments at least portions of the power consumption optimization system 102 and one or more of the data centers 104 are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in a first geographic location while other components of the system reside in one or more other geographic locations that are potentially remote from the first geographic location. Thus, it is possible in some implementations of the system 100 for the power consumption optimization system 102 and data centers 104 or portions or components thereof, to reside in different geographic locations. Numerous other distributed implementations are possible.

Additional examples of processing platforms utilized to implement the power consumption optimization system 102 in illustrative embodiments will be described in more detail below in conjunction with FIGS. 7 and 8.

It is to be appreciated that these and other features of illustrative embodiments are presented by way of example only, and should not be construed as limiting in any way.

An exemplary process for reducing power consumption of a data center while maintaining specified performance benchmarks utilizing a reinforcement learning framework will now be described in more detail with reference to the flow diagram of FIG. 2. It is to be understood that this particular process is only an example, and that additional or alternative processes for reducing power consumption of a data center while maintaining specified performance benchmarks utilizing a reinforcement learning framework can be carried out in other embodiments.

In this embodiment, the process includes steps 200 through 210. These steps are assumed to be performed by the power consumption optimization system 102 utilizing the environmental data aggregation module 120, the performance monitoring module 122 and the reinforcement learning logic module 124. The process begins with step 200, obtaining a first set of parameters characterizing an operating state of a plurality of heterogeneous IT resources of a data center and a second set of parameters characterizing an operating state of one or more cooling systems of the data center. The heterogeneous IT resources of the data center may comprise, for example, different computing nodes in the data center. The cooling systems of the data center may comprise a set of air conditioning units.

The first set of parameters may comprise telemetry information obtained from the plurality of heterogeneous IT resources of the data center, the telemetry information comprising: temperature measurements for one or more hardware components of each of the plurality of heterogeneous IT resources for a given period of time; and power consumption measurements for each of the plurality of heterogeneous IT resources for the given period of time. The first set of parameters may further or alternatively comprise resource management information obtained from the plurality of heterogeneous IT resources of the data center, the resource management information comprising two or more of: average central processing unit (CPU) speed measurements for each of the plurality of heterogeneous IT resources for a given period of time; CPU load measurements for each of the plurality of heterogeneous IT resources for the given period of time; average uptime measurements for each of the plurality of heterogeneous IT resources for the given period of time; and average memory measurements for each of the plurality of heterogeneous IT resources for the given period of time.

The first set of parameters may further or alternatively comprise task management information for a plurality of workloads scheduled for execution on the plurality of heterogeneous IT resources of the data center, the task management information comprising two or more of: expected CPU requirements for at least a subset of the plurality of workloads scheduled for execution on the plurality of heterogeneous IT resources for a given upcoming period of time; expected memory requirements for at least a subset of the plurality of workloads scheduled for execution on the plurality of heterogeneous IT resources for the given upcoming period of time; expected time for completion for at least a subset of the plurality of workloads scheduled for execution on the plurality of heterogeneous IT resources; a most recent wait time for the plurality of workloads scheduled for execution on the plurality of heterogeneous IT resources; and a most recent execution time for the plurality of workloads scheduled for execution on the plurality of heterogeneous IT resources.

The second set of parameters may comprise telemetry information obtained from the one or more cooling systems, the telemetry information comprising two or more of: air flow measurements for each of a plurality of air conditioning units of the one or more cooling systems for a given period of time; input temperature measurements for each of the plurality of air conditioning units of the one or more cooling systems for the given period of time; output temperature measurements for each of the plurality of air conditioning units of the one or more cooling systems for the given period of time; and power consumption measurements for each of the plurality of air conditioning units of the one or more cooling systems for the given period of time.

Figure 2:
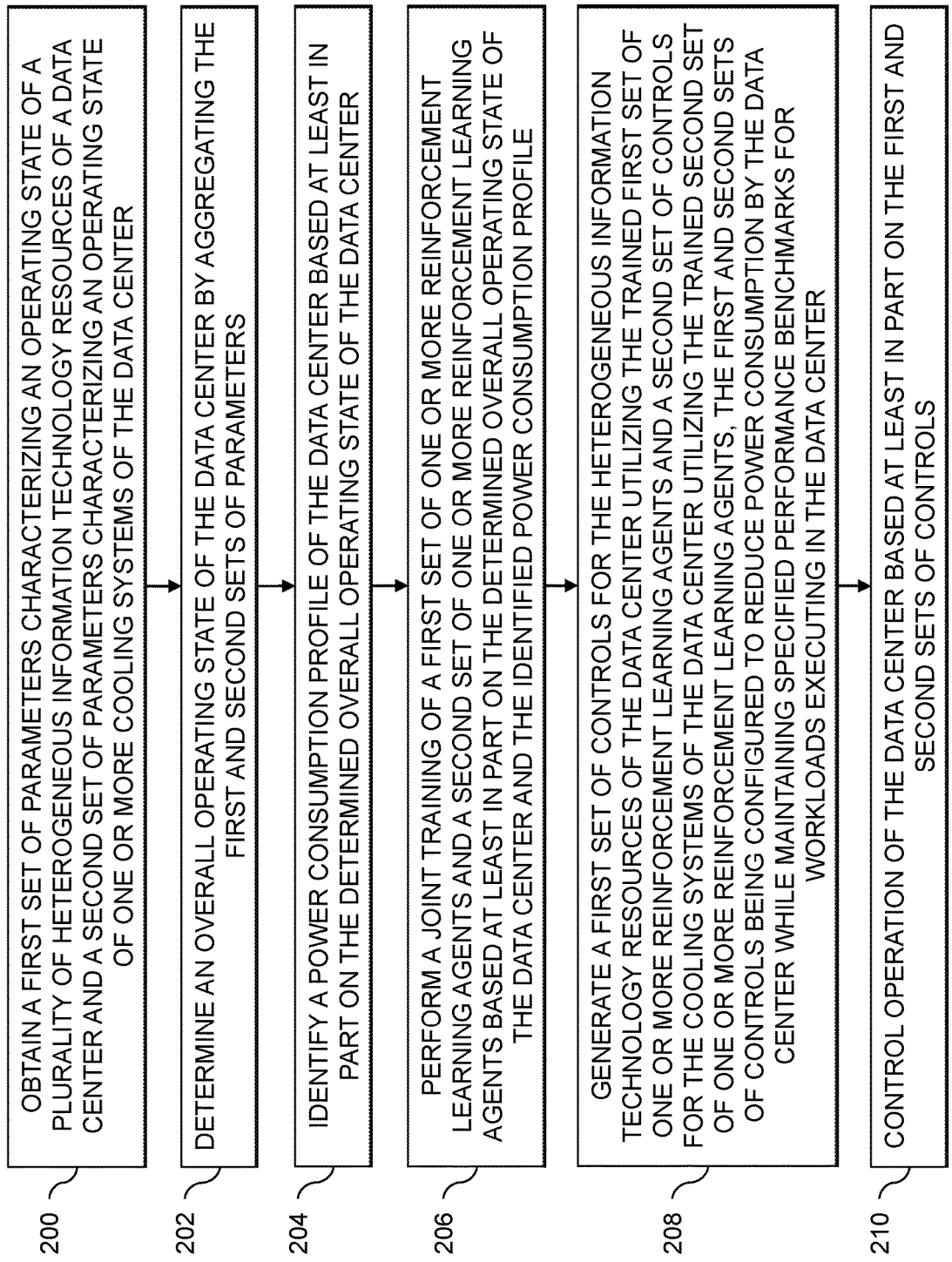
FIG. 2 is a flow diagram of an exemplary process for reducing power consumption of a data center while maintaining specified performance benchmarks utilizing a reinforcement learning framework in an illustrative embodiment.

The FIG. 2 process continues with step 202, determining an overall operating state of the data center by aggregating the first and second sets of parameters. In step 204, a power consumption profile of the data center is identified based at least in part on the determined overall operating state of the data center. The power consumption profile identified in step 204 may be referred to as a joint reward for power consumption by both the heterogeneous IT resources of the data center and the cooling systems of the data center, subject to performance benchmarks for workloads executing in the data center. In some embodiments, the goal is to optimize the power consumption profile, such as by reducing overall power consumption while maintaining specified performance benchmarks for the workloads executing in the data center.

Step 204 may include identifying a joint reward characterizing power consumption by the data center as a weighted summation of reward components identified from the first and second sets of parameters. The weighted summation may comprise reward components for: at least one of CPU speed measurements, CPU load measurements, uptime measurements and memory measurements for the plurality of heterogeneous IT resources in the first set of parameters; at least one of a most recent wait time and a most recent execution time for workloads scheduled for execution on the plurality of heterogeneous IT resources in the first set of parameters; power consumption measurements for the plurality of heterogeneous IT resources in the first set of parameters; and power consumption measurements for each of a plurality of air conditioning units of the one or more cooling systems in the second set of parameters.

In step 206, joint training of a first set of one or more reinforcement learning agents and a second set of one or more reinforcement learning agents is performed based at least in part on the overall operating state of the data center determined in step 202 and power consumption profile identified in step 204. A first set of controls for the plurality of heterogeneous IT resources of the data center is generated utilizing the trained first set of one or more reinforcement learning agents and a second set of controls for the one or more cooling systems of the data center is generated utilizing the trained second set of one or more reinforcement learning agents in step 208. The first and second sets of controls are configured to reduce power consumption by the data center while maintaining specified performance benchmarks for workloads executing in the data center. The first set of controls may comprise identification of workloads to be assigned to respective ones of the plurality of heterogeneous IT resources for execution in an upcoming period of time. The second set of controls may comprise temperature setpoint information for each of a plurality of air conditioning units of the one or more cooling system for an upcoming period of time.

Step 206 may include utilizing a Multi-Agent Deep Deterministic Policy Gradient algorithm. Jointly training the first and second sets of one or more reinforcement learning agents may comprise computing updated weights for respective ones of the first and second sets of one or more reinforcement learning agents based at least in part on information stored in a training data buffer. The information stored in the training data buffer may comprise a set of tuples each comprising: a first overall operating state of the data center for a first time period; first and second sets of controls generated utilizing the first and second sets one or more reinforcement learning agents for the first time period; a power consumption profile for the first time period; and a second overall operating state of the data center for a second time period subsequent to the first time period. Step 208 may comprise combining the computed updated weights with existing weights for the first and second sets of one or more reinforcement learning agents, and performing inference utilizing the first and second sets of one or more reinforcement learning agents with the combined weights.

It should be noted that generating the first set of controls in step 208 comprises utilizing the trained first set of one or more reinforcement learning agents independent of the trained second set of one or more reinforcement learning agents, and that generating the second set of controls in step 208 comprises utilizing the trained second set of one or more reinforcement learning agent independent of the trained first set of one or more reinforcement learning agents. In other words, while the first and second sets of one or more reinforcement learning agents are jointly trained, inference is performed using the first and second sets of one or more reinforcement learning agents independently.

In step 210, operation of the data center is controlled based at least in part on the first and second sets of controls generated in step 208. Steps 200 through 210 of the FIG. 2 process may be repeated for each of two or more time periods, where each of the two or more time periods is associated with a change in the operating state of the plurality of heterogeneous IT resources of the data center. The change in the operating state of the plurality of heterogeneous IT resources of the data center may comprise at least one of: arrival of one or more new workloads in a queue of workloads to be scheduled on the plurality of heterogeneous IT resources of the data center; and completion of one or more workloads currently operating on one or more of the plurality of heterogeneous IT resources of the data center.

Data center power costs are significant. For example, data centers in 2018 are estimated to have consumed about 205 terawatt-hours of electricity. The estimated cost for powering data centers in 2020 is $13,000,000,000. By 2030, data centers are expected to reach approximately 8% of the world's total power consumption. According to research, an average data center has about 30-40% of its electricity consumed by cooling systems. Thus, optimizing cooling systems of data centers can provide significant improvements in overall power consumption of data centers. As a general rule, data center cooling may be approximately 10-15% of capital cost per annum over the life of the equipment. For large data centers, this reaches into the tens of millions of dollars. The term "power usage efficiency" or PUE is a benchmark used in the industry. PUE figures can range from 1.04 to 1.8, with 1.0 being a perfect score meaning that all power to the data center is used to power the hardware thereof (e.g., servers, storage systems and other IT infrastructure) and no power is used for cooling. Data center operators, such as IT departments, are thus continually looking to save costs through cooling efficiencies as the cost of cooling is such a large portion of their budgets.

Conventional approaches for data center power optimization are typically deterministic and need to be adapted to each data center. Static statistical approaches, however, do not adapt well to changing data center environments. As such, these approaches are not scalable as they require experts to do custom optimization for each data center. Such approaches are also unable to adapt to unexpected changes as they do not learn from experience. Interactions between individually optimized components in a heterogeneous data center leaves considerable space for optimization or improvement of the system or data center as whole, even where the data center includes individually optimized system components.

Figure 3:
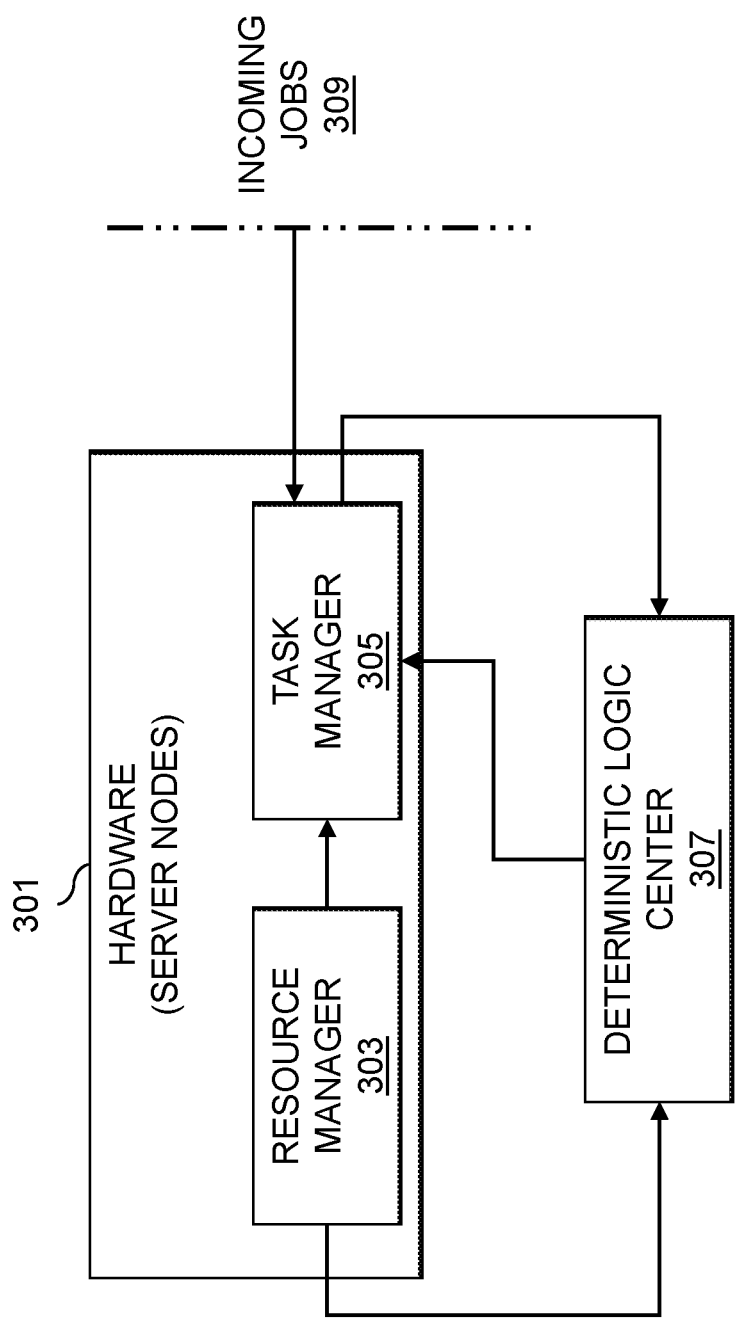
FIG. 3 shows an example of a deterministic approach for controlling hardware of a data center in an illustrative embodiment.

FIG. 3 shows a visualization of a deterministic approach for data center optimization. FIG. 3 shows hardware (e.g., server nodes) 301 of a data center. It should be appreciated that the hardware 301 of a data center is not limited solely to server nodes, but may also include storage systems, network equipment, etc. More generally, the hardware 301 of a data center may include any combination of compute, storage and network resources. The hardware 301 of the data center implements a resource manager 303 and a task manager 305. The resource manager 303 and task manager 305 may be implemented at least in part external to the hardware 301 in some embodiments. A deterministic logic center 307 receives information from the resource manager 303 and task manager 305, and provides feedback to the task manager 305. Although shown as external to the hardware 301 in FIG. 3, the deterministic logic center 307 may be implemented at least in part internal to the hardware 301 in some embodiments. The task manager 305 also receives incoming jobs 309 to be run on the hardware 301 of the data center.

The deterministic approach illustrated in FIG. 3 has various limitations and shortcomings. The optimization methods implemented by the deterministic logic center 307 are deterministic and require extensive modification before they can be applied to different hardware configurations.

Therefore, such approaches are not scalable. Deterministic approaches may also perform optimization for individual systems (e.g., individual server nodes) of the overall data center, rather than optimization for the data center as a whole (e.g., the system of the systems). Interactions between individually optimized components in a heterogeneous data center leaves considerable space for optimization of the data center as a whole. Deterministic approaches also do not learn from experience, and cannot be extended to include additional and competing optimization criteria.

Illustrative embodiments provide a reinforcement learning framework which utilizes dynamic controls to minimize or reduce power consumption of data centers with heterogeneous IT infrastructure while maintaining expected performance benchmarks. In some embodiments, the reinforcement learning framework is integrated with the hardware of a data center as an artificial intelligence (AI) logic center designed for increasing efficiency of the data center. The AI logic center thereby enables the data center to achieve an optimal operating state continuously and autonomously. The decision engine of the reinforcement learning framework is based on reinforcement learning and thus may be stochastic in nature. The decision engine learns by interacting with the data center environment, and therefore can generalize to a variety of heterogeneous data centers making the solution highly scalable. Reinforcement learning agents are configured to learn throughout their lifecycles, and thus can adapt to changing conditions on-the-fly.

The reinforcement learning framework is advantageously configured to use all available data and information about the environment of a data center to create a mathematical representation of the data center (e.g., a system of systems). This representation is referred to as a state. The state, or selected state variables, are read by a reinforcement learning agent. The reinforcement learning agent then takes an action in the data center and receives a reward based on the outcome. The action modifies the state of the environment, which is then read by the reinforcement learning agent and the process is repeated. The reinforcement learning agent is configured to select the actions taken so as to maximize the sum of the rewards it receives.

Figure 4:
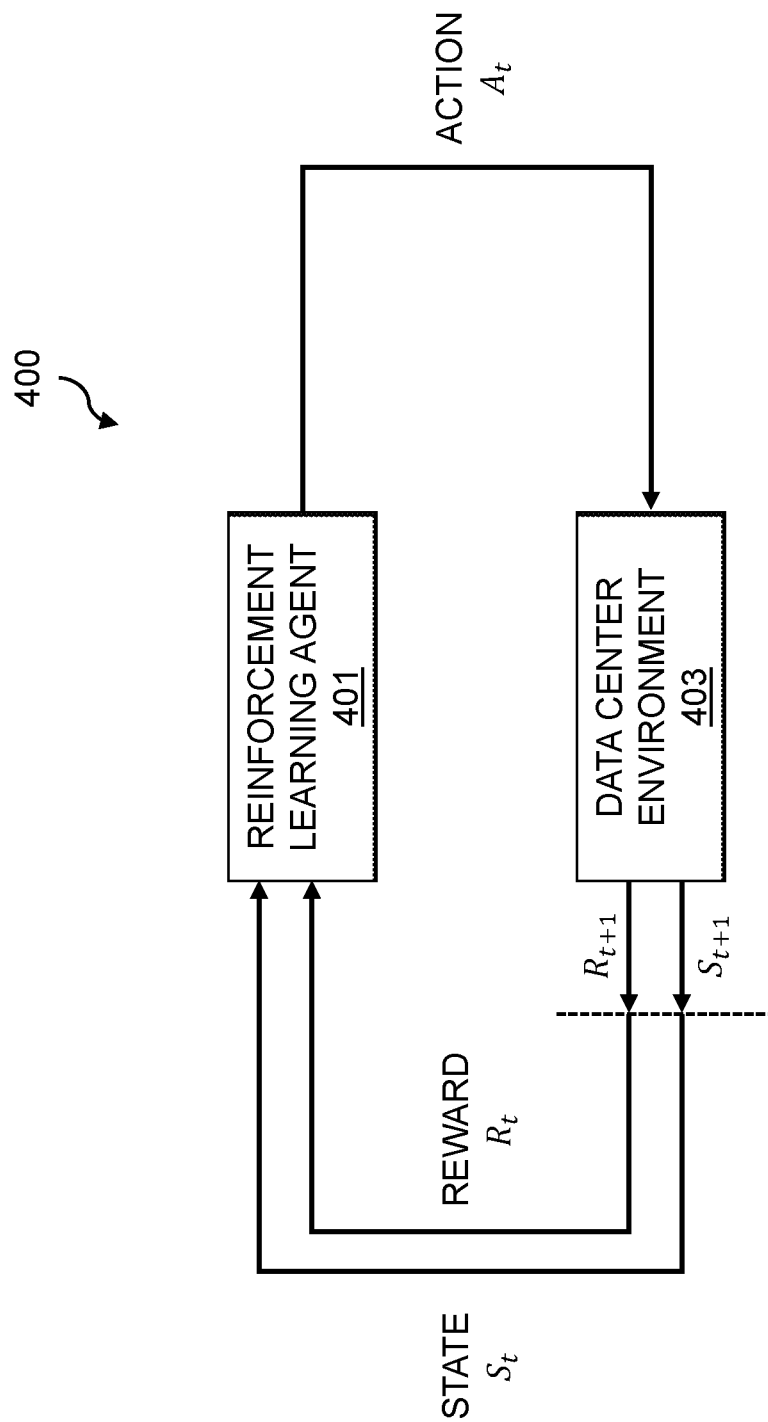
FIG. 4 shows a reinforcement learning framework for optimizing data center operation in an illustrative embodiment.

FIG. 4 illustrates such a reinforcement learning framework 400, which includes a reinforcement learning agent 401 and a data center environment 403. The reinforcement learning agent 401 may work on the mathematical framework of Markov Decision Processes (MDPs). MDPs are simple and widely applicable and are effective in a variety of tasks for reinforcement learning, such as in robotics, self-driving cars, stock trading, natural language processing (NLP), etc. As shown, the reinforcement learning agent 401 receives a state $S_t$ and reward $R_t$ from the data center environment 403, and then takes an action $A_t$ in the data center environment 403. $S_t$ represents the state of the data center environment 403 at time t, represented by the different variables that are used to report available information about the data center environment 403. $A_t$ represents the action taken by the reinforcement learning agent 401 at time t, based on the observed state $S_t$. $R_t$ represents the reward received by the reinforcement learning agent 401 based on the state $S_t$ and action $A_t$. After applying action $A_t$, the data center environment 403 then updates to state $S_{t+1}$ and reward $R_{t+1}$, and provides $S_{t+1}$ and $R_{t+1}$ to the reinforcement learning agent 401 for another optimization iteration. The state $S_{t+1}$ represents the new state of the data center environment 403 reached following action $A_t$.

Although FIG. 4 shows an example with just a single reinforcement learning agent 401, various embodiments utilize multi-agent reinforcement learning. For example, there may be a first set of one or more agents for a task manager (e.g., that is responsible for assigning jobs to different server nodes in a data center) and a second set of one or more agents for cooling systems (e.g., for controls thereof that are responsible for setting target temperatures for air conditioning units). Both the first and second sets of agents, as described in further detail elsewhere herein, may have a common reward function to maximize. In some cases, the first and second sets of agents each include one agent. For example, there may be a first reinforcement learning agent for the task manager and a second reinforcement learning agent for controls of the cooling systems. Both the first and second reinforcement learning agent have a common reward function. In other cases, such as for large data centers, there may be multiple agents in one or both of the first and second sets of agents. For example, there may be A agents in the first set and B agents in the second set, where at least one of A>1 and B>1. Again, the first and second sets of agents have a common reward function. The particular number of agents in the first and second sets is a hyperparameter that may be adjusted as desired during deployment. In either case, the task manager and cooling systems are controlled by independent agents.

FIGS. 5A-5D illustrate a process for data center optimization utilizing a reinforcement learning framework. The data center 500 in FIGS. 5A-5D includes hardware 501 that implements or is associated with telemetry 503, a resource manager 505 and a task manager 507. The hardware 501 may comprise server nodes, or more generally any type of IT infrastructure of the data center 500, including various combinations of compute, storage and network resources. Although shown as internal to the hardware 501 of the data center 500 in FIGS. 5A-5D, it should be appreciated that one or more of the telemetry 503, resource manager 505 and task manager 507 may be implemented at least partially external to the hardware 501, such as in a system that is external to the data center 500. The telemetry 503 collects telemetry information from various hardware components of ones of the heterogeneous server nodes in the hardware 501. The resource manager 505 monitors current utilization of available compute, storage and network resources of the hardware 501. The task manager 507 receives job requests and allocates jobs to the hardware 501. The task manager 507 may also be referred to as a load balancer, or as providing load balancing functionality for the heterogeneous server nodes or more generally IT infrastructure that forms the hardware 501 of data center 500.

The data center 500 further includes one or more air conditioning systems 509. The air conditioning systems 509 are an example of what is more generally referred to herein as cooling systems. The air conditioning systems 509 implement or are associated with controls 511 and telemetry 513. The telemetry 513 collects telemetry information from the air conditioning systems 509, and the controls 511 adjust controls of the air conditioning systems to reach a target ambient temperature. The controls 511 may include, but are not limited to, on/off settings, temperature setpoints, fan or blower speeds, fan or blower directions, etc.

The data center 500 is also shown including an environment aggregator 515, performance monitor 517 and reinforcement learning logic center 519. The environment aggregator 515, performance monitor 517 and reinforcement learning logic center 519 are example implementations of the environmental data aggregation module 120, the performance monitoring module 122 and the reinforcement learning logic module 124, respectively, of the power consumption optimization system 102. In illustrative embodiments, the environment aggregator 515, performance monitor 517 and reinforcement learning logic center 519 are implemented as software or virtual computing resources (e.g., VMs, containers) running on a compute node that is assumed to be separate from the hardware 501 of the data center 500 that is being optimized. Such a compute node may be implemented external to the data center 500, such as in the arrangement shown in FIG. 1 where the power consumption optimization system 102 is external to data centers 104. This, however, is not a requirement.

In some embodiments, the environment aggregator 515, performance monitor 517 and reinforcement learning logic center 519 are implemented internal to the data center 500, such as on a dedicated compute node that is collocated with the hardware 501 of the data center 500 but which is not optimized as described herein. In other embodiments, one or more of the environment aggregator 515, performance monitor 517 and reinforcement learning logic center 519 are implemented at least partially within hardware 501 of the data center 500 (e.g., possibly as local agents that communicate with another system such as power consumption optimization system 102 that is external to the data center 500) that is being optimized as described herein. Various other configurations are possible.

The environment aggregator 515 is configured to take in different parameters and to generate combinations thereof to create one or more holistic representations of the data center 500 environment. Such representations are optimized for delivery of necessary information to individual agents being used to optimize the data center 500 environment. The performance monitor 517 calculates the value of the joint-reward function. The reinforcement learning logic center 519 has multiple learning agents that utilize the environmental state representations from the environment aggregator 515 and the joint-reward values from the performance monitor 517 to make decisions on actions to take within the data center 500. In some embodiments, the reinforcement learning logic center 519 utilizes a Multi-Agent Deep Deterministic Policy Gradient (MADDPG) algorithm to jointly train the various learning agents of the reinforcement learning logic center 519. The decisions (e.g., actions) are transmitted to the control centers of the data center 500 (e.g., controls 511 of the air conditioning systems 509, task manager 507 of the hardware 501, etc.) to alter the operating state of the data center 500 to attain improved performance. The time space for the reinforcement learning logic center 519 is discrete, and the time step may be incremented after every action-reward cycle as described above in conjunction with FIG. 4.

Figure 5A:
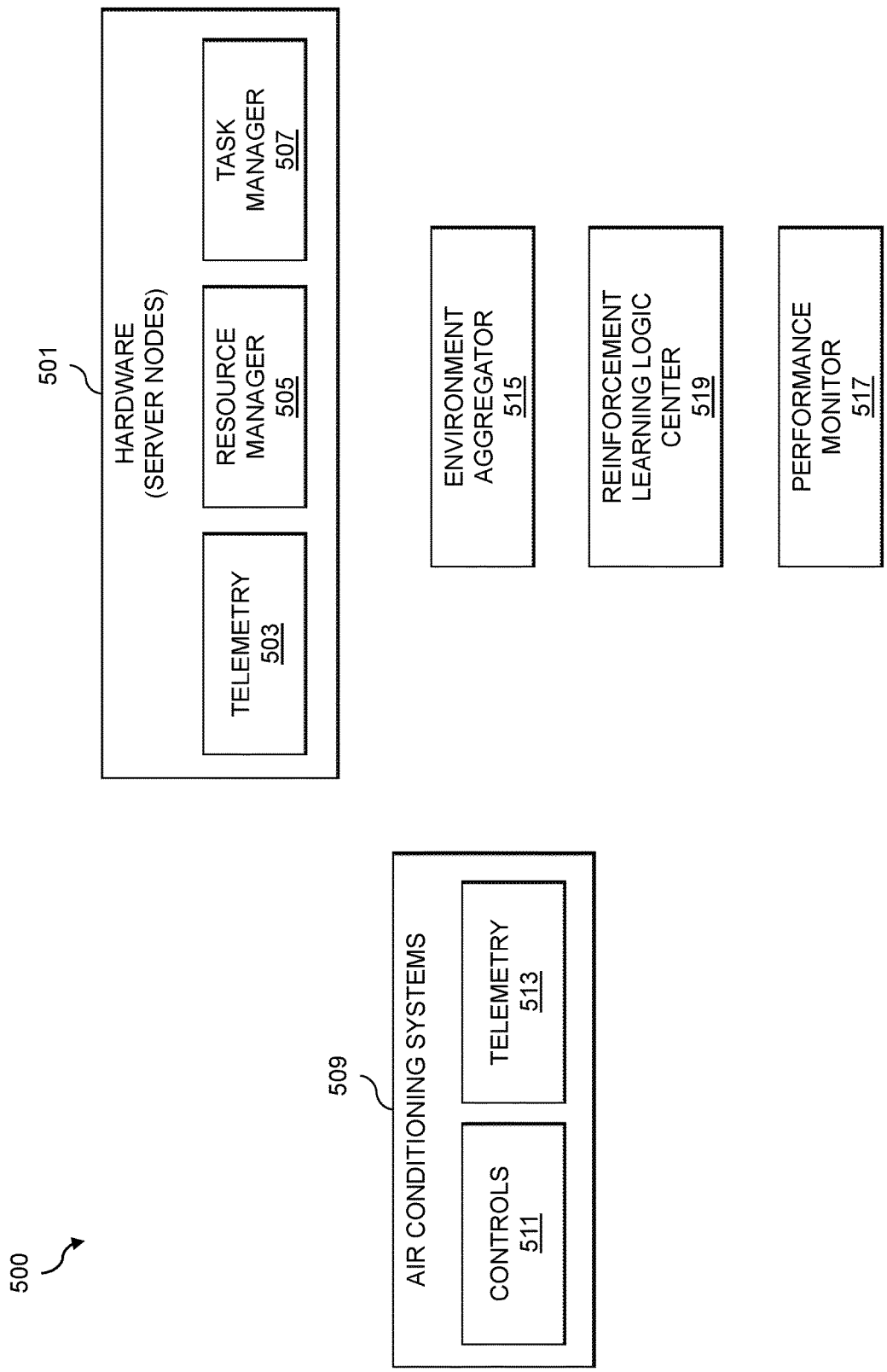
FIGS. 5A-5D show an example of a reinforcement learning approach for optimizing data center operation in an illustrative embodiment.
Figure 5B:
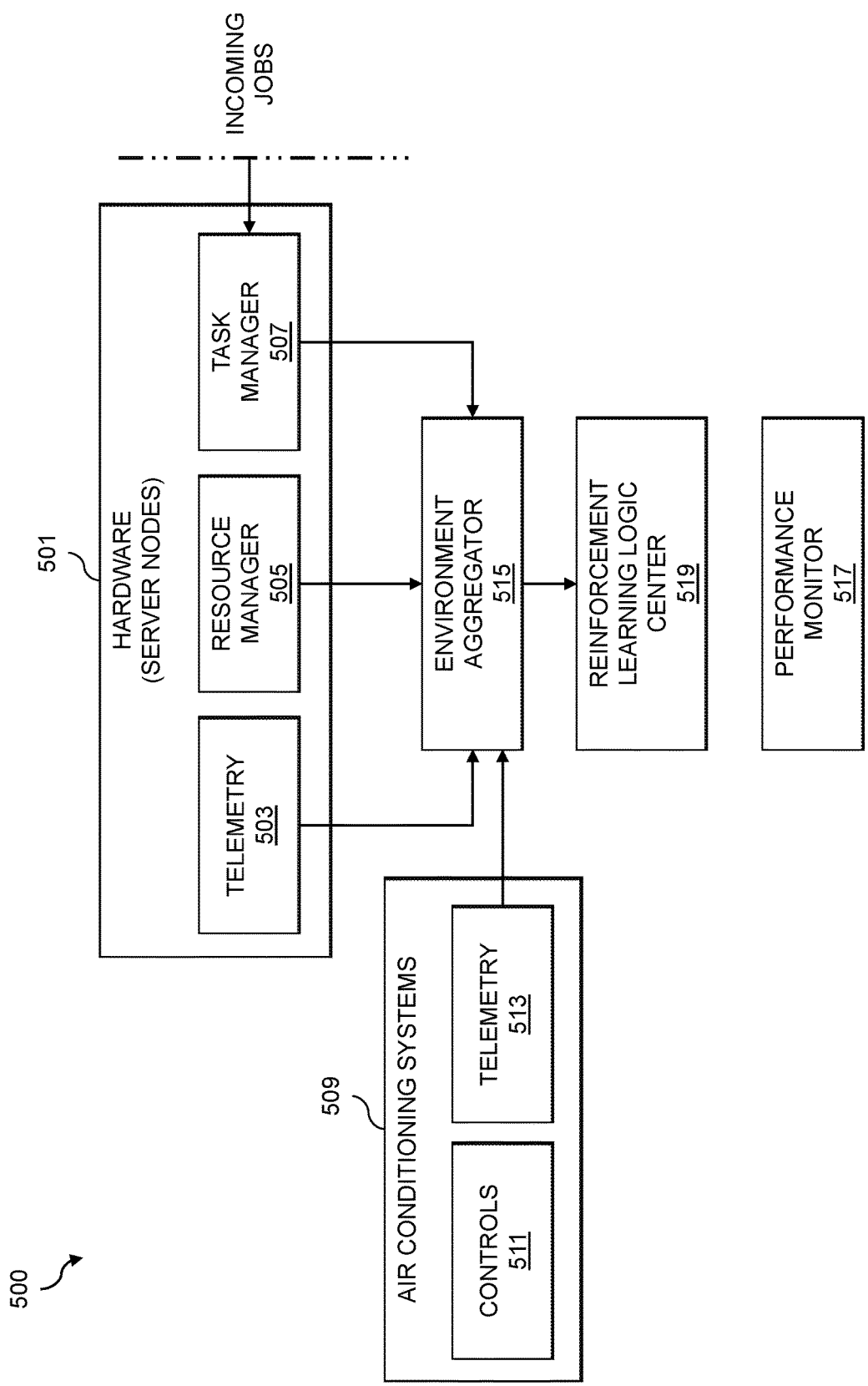
Figure 5C:
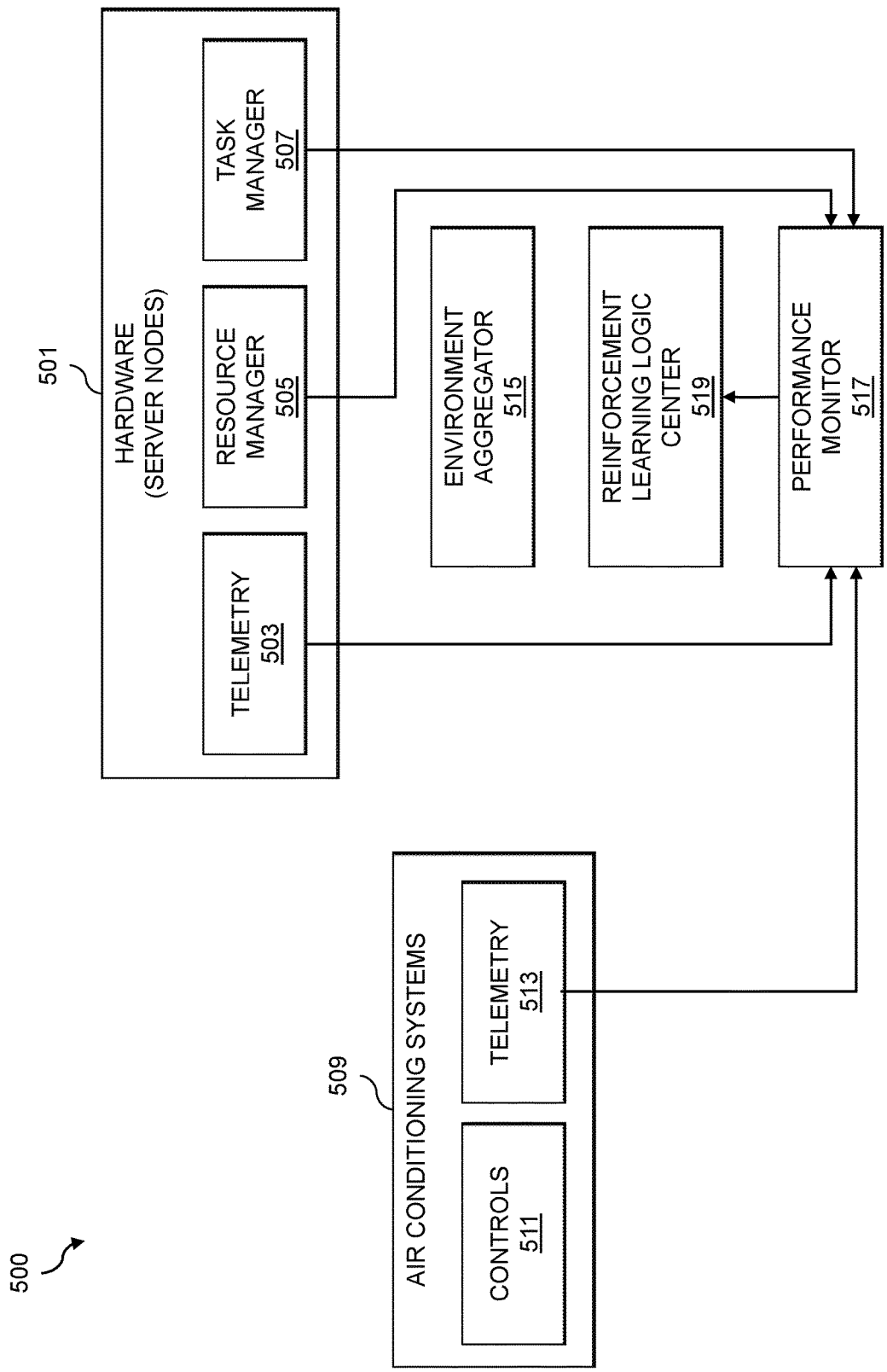
Figure 5D:
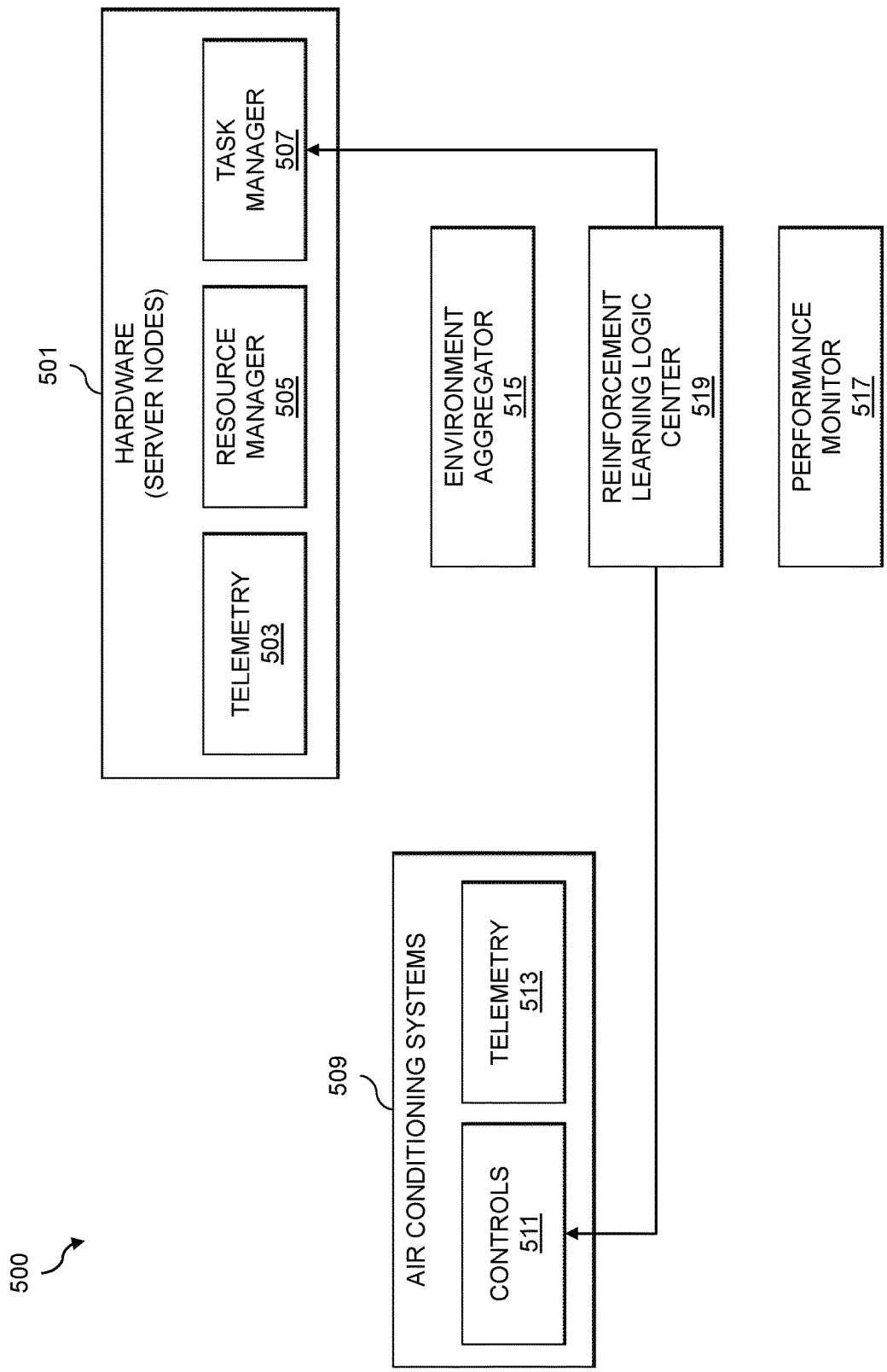

As shown in FIG. 5B, the environment aggregator 515 utilizes information from the telemetry 503 and 513 of the hardware 501 and air conditioning systems 509, as well as data from the resource manager 505 and task manager 507, to generate environments for the learning agents of the reinforcement learning logic center 519. As shown in FIG. 5C, the performance monitor 517 utilizes information from the telemetry 503 and 513 of the hardware 501 and air conditioning systems 509, as well as data from the resource manager 505 and task manager 507, to generate joint rewards for the learning agents of the reinforcement learning logic center 519 to learn optimal actions to take. As shown in FIG. 5D, the reinforcement learning logic center 519 takes such actions using one or both of the controls 511 of the air conditioning systems 509 and the task manager 507 of the hardware 501.

The vector of the signals provided to the environment aggregator 515 from telemetry 503 of hardware 501 may be represented as:

$$S_{Tt}=[[T_{00}, \ldots, T_{0(n-1)}],[T_{10}, \ldots, T_{1(n-1)}], \ldots, [T_{(m-1)0}, \ldots, T_{(m-1)(n-1)}],[P_0, \ldots, P_{(m-1)}]],$$

where $S_{Tt}$ represents the telemetry information from telemetry 503 of hardware 501. This vector contains temperatures (T) recorded from n components of m computing nodes, as well as the total power consumption (P) from the m computing nodes.

The vector of the signals provided to the environment aggregator 515 from the resource manager 505 of the hardware 501 may be represented as:

$$S_{Rm}=[[CS_0, \ldots, CS_{m-1}],[CL_0, \ldots, CL_{m-1}], [U_0, \ldots, U_{m-1}],[M_0, \ldots, M_{m-1}]],$$

where $S_{Rm}$ represents the data from the resource manager 505 of hardware 501. This vector contains values of average central processing unit (CPU) speed (CS), CPU load (CL), average uptime (U) and average memory (M) for the m computing nodes.

The vector of the signals provided to the environment aggregator 515 from the task manager 507 of the hardware 501 may be represented as:

$$S_{Tm}=[[EC_0, \ldots, EC_{q-1}],[EM_0, \ldots, EM_{q-1}], \ldots, [ET_0, \ldots, ET_{q-1}],[Tw],[Tx]]$$

where $S_{Tm}$ represents the data from the task manager 507 of hardware 501. This vector contains the expected CPU requirement (EC), expected memory requirement (EM), and expected time for completion (ET) for the next q jobs in sequence, where q is a hyperparameter that may be specified as desired for a particular implementation. Tw and Tx are the most recent wait time and execution time, respectively.

The vector of the signals provided to the environment aggregator 515 from the telemetry 513 of the air conditioning systems 509 may be represented as:

$$S_{AcTl}=[[AF_0, \ldots, AF_{r-1}],[IT_0, \ldots, IT_{r-1}], \ldots, [OT_0, \ldots, OT_{r-1}],[AP_0, \ldots, AP_{r-1}]]$$

where $S_{AcTl}$ represents the data from the telemetry 513 of air conditioning systems 509. This vector contains the airflow (AF), input temperature (IT), output temperature (OT), and power (AP) consumed by the r air conditioning units in the facility housing the data center 500.

The time space used by the reinforcement learning logic center 519 is discrete. A change in time (e.g., increment by one) is recorded in some cases whenever the steady state is changed. A change in steady state may be caused by the arrival of a new job in the waiting queue of the task manager 507 or completion of a currently processing job. All the variables being observed are averaged for the time period between these changes, in order to make the collection time scales coherent with the discrete time scale used in various embodiments.

Based on the environment variables reported by the environment aggregator 515, the reinforcement learning logic center 519 takes optimal actions in order to maximize the aggregated value of the joint-reward function discussed in further detail below. It should be noted that the reinforcement learning logic center 519 takes "actions" by giving directions to the controls 511 of the air conditioning systems 509 and the task manager 507 of the hardware 501. Based on these directions, the controls 511 of the air conditioning systems 509 manipulate target temperatures, and the task manager 507 of the hardware 501 allocates jobs or workloads to server nodes or other IT infrastructure in the hardware 501.

Individual control signals or actions for the air conditioning systems 509 may be represented as:

$$C_{AC}=[a_0,a_1,\ldots,a_{r-1}], \forall a_i \in \{-1,0,1\}$$

where $C_{AC}$ is the control signal for the air conditioning systems 509. The variable $a_i$ is the action for the $i^{th}$ (out of r) AC unit. A value of −1 implies a decrease in target temperature by T degree Celsius, 0 implies no change in the target temperature, and 1 implies an increase in target temperature by T degree Celsius. The value of T is a hyperparameter, and may be optimized during training.

Individual control signals or actions for the hardware 501 may be represented as:

$$C_{TM}=[\alpha_0,\alpha_1,\ldots,\alpha_{p-1}], \forall \alpha_i \in \{0,1\}$$

where $C_{TM}$ is the control signal for the task manager 507. The variable $\alpha_i$ is the action for the $i^{th}$ (out of p) computing node. A value of 1 implies that the next job in the queue is assigned to the $i^{th}$ computing node. Only one of the p entries of the vector $C_{TM}$ can be 1 and all other entries are 0.

The joint reward function utilized by the performance monitor 517 will now be described. The joint-reward is calculated by the performance monitor 517 using components of the data center 500 environment that represent quantitatively the attributes that need to be increased or decrease (e.g., maximized or minimized) in order to achieve improved performance (e.g., optimality) of the data center 500.

The reward signal for the resource manager 505 of hardware 501 may be represented as:

$$R_{Rm}=[[CS_0,\ldots,CS_{m-1}],[CL_0,\ldots,CS_{m-1}],[U_0,\ldots,U_{m-1}],[M_0,\ldots,M_{m-1}]]$$

where $R_{Rm}$ denotes the resource manager reward signal, and CS, CL, U and M have similar meanings as described above.

The reward signal for the task manager 507 of hardware 501 may be represented as:

$$R_{Tm}=[[Tw],[Tx]]$$

where $R_{Tm}$ denotes the task manager reward signal, and Tw and Tx have similar meanings as in the environment signals described above.

The reward signal for the telemetry 503 of hardware 501 may be represented as:

$$R_{Tl}=[[P_0,P_{m-1}]]$$

where $R_{Tl}$ denotes the hardware telemetry reward signal, and P has a similar meaning as in the environment signals described above.

The reward signal for the telemetry 513 of the air conditioning systems 509 may be represented as:

$$R_{AcTl}=[[AP_0,\ldots,AP_{r-1}]]$$

where $R_{AcTl}$ denotes the air conditioning system telemetry reward signal, and AP has a similar meaning as in the environment signals described above.

The joint reward signal may be generated according to the function:

$$R=a\Sigma CS_i+b\Sigma CL_i+c\Sigma M_i+d\Sigma S_i+eTw+(1-e)Tx-f\Sigma P_i-g\Sigma AP_i$$

where a, b, c, d, e, f and g are hyperparameters that are finetuned for optimal performance. The summation is over the individual elements of the vectors that make up the reward signals. The vectors discussed above are for one timestep (e.g., time between two steady state changes). Once a change in the steady state is observed (e.g., arrival or completion of a job), based on the observations from the environment aggregator 515, the reinforcement learning logic center 519 takes one or more control actions (e.g., provides directions to task manager 507 of hardware 501 and/or controls 511 of air conditioning systems 509). The joint reward is a scalar, and is calculated after a new steady state is achieved and then the cycle is repeated.

Figure 6:
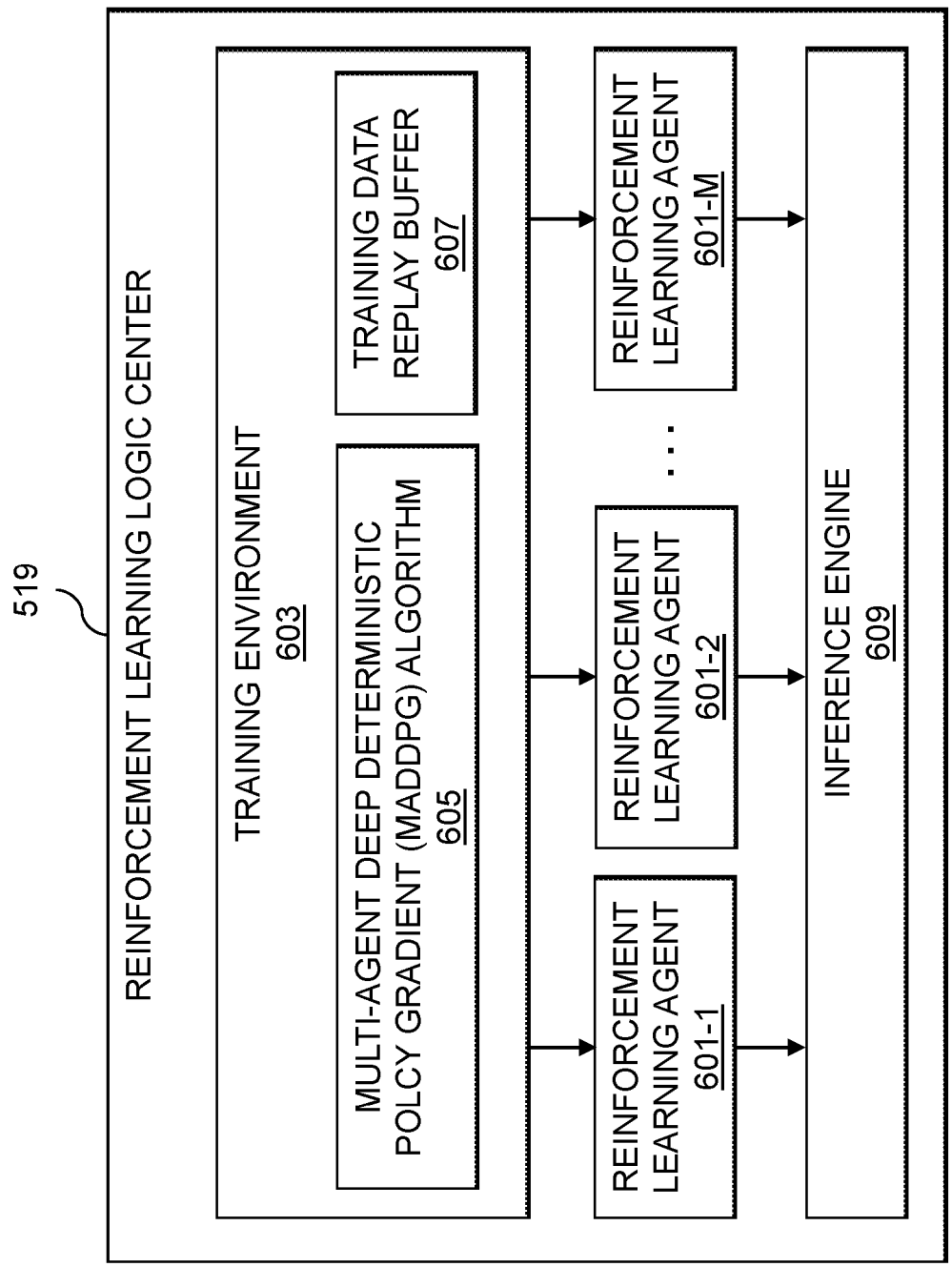
FIG. 6 illustrates training and inference of reinforcement learning agents in a reinforcement learning logic center used to optimize data center operation in an illustrative embodiment.

The reinforcement learning logic center 519 may be implemented as a virtual system that comprises reinforcement learning agents (e.g., multiple instances of the learning agent 401 shown in FIG. 4) and the associated infrastructure required for continual functioning and learning. Such an arrangement is illustrated in FIG. 6, where the reinforcement learning logic center 519 includes a set of reinforcement learning agents 601-1, 601-2, . . . 601-M (collectively, reinforcement learning agents 601). As noted above, the particular number M of reinforcement learning agents is a hyperparameter that may be adjusted as desired for a particular deployment. Generally, M is at least 2, with there being at least one reinforcement learning agent for controlling the air conditioning systems 509 and at least one reinforcement learning agent for controlling the task manager 507.

As further illustrated in FIG. 6, the reinforcement learning logic center 519 includes a training environment 603 implementing a MADDPG algorithm 605 and a training data replay buffer 607, as well as an inference engine 609. The training environment 603 utilizes the MADDPG algorithm 605 to periodically train the reinforcement learning agents 601 (e.g., to update weights thereof) using the training data replay buffer 607. The training data replay buffer 607 is dynamic in nature, and collects the last N State-Action-Reward-NewState $(S_t,A_t,R_t,S_{t+1})$ tuples, where N is a hyperparameter that may be adjusted as desired for a particular deployment. The inference engine 609 utilizes the trained reinforcement learning agents 601 to take real-time actions in the data center 500. The updated weights from the training environment 603 for the reinforcement learning agents 601 are combined with weights of the reinforcement learning agents 601 from the inference engine using a soft-merge. The objective of the reinforcement learning agents 601 is to increase or maximize the total value of the joint reward that is received over time.

Advantageously, illustrative embodiments utilize a multi-agent reinforcement learning framework to optimize power consumption of data centers. This framework is able to learn from experience, and thus is highly scalable as it can generalize to a variety of different data center configurations. The framework also advantageously takes a unified approach towards optimization, by performing a joint optimization by controlling cooling systems and a load balancer of IT infrastructure of a data center to achieve minimum power consumption while maintaining expected levels of performance. The framework is further highly flexible to extension, as the reinforcement learning logic center may be extended to include additional and competing optimization criteria, such as criteria for maximizing health of the cooling systems and/or IT infrastructure of a data center. Reinforcement learning provides opportunities for dynamic environments such as data centers by making data centers more intelligent and enabling functionality such as failure prediction and mitigation, self-healing, endurance maximization, optimal utilizing and power reduction, etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for reducing power consumption of a data center while maintaining specified performance benchmarks utilizing a reinforcement learning framework will now be described in greater detail with reference to FIGS. 7 and 8. Although described in the context of system 100, these platforms may also be used to implement at least portions of other information processing systems in other embodiments.

Figure 7:
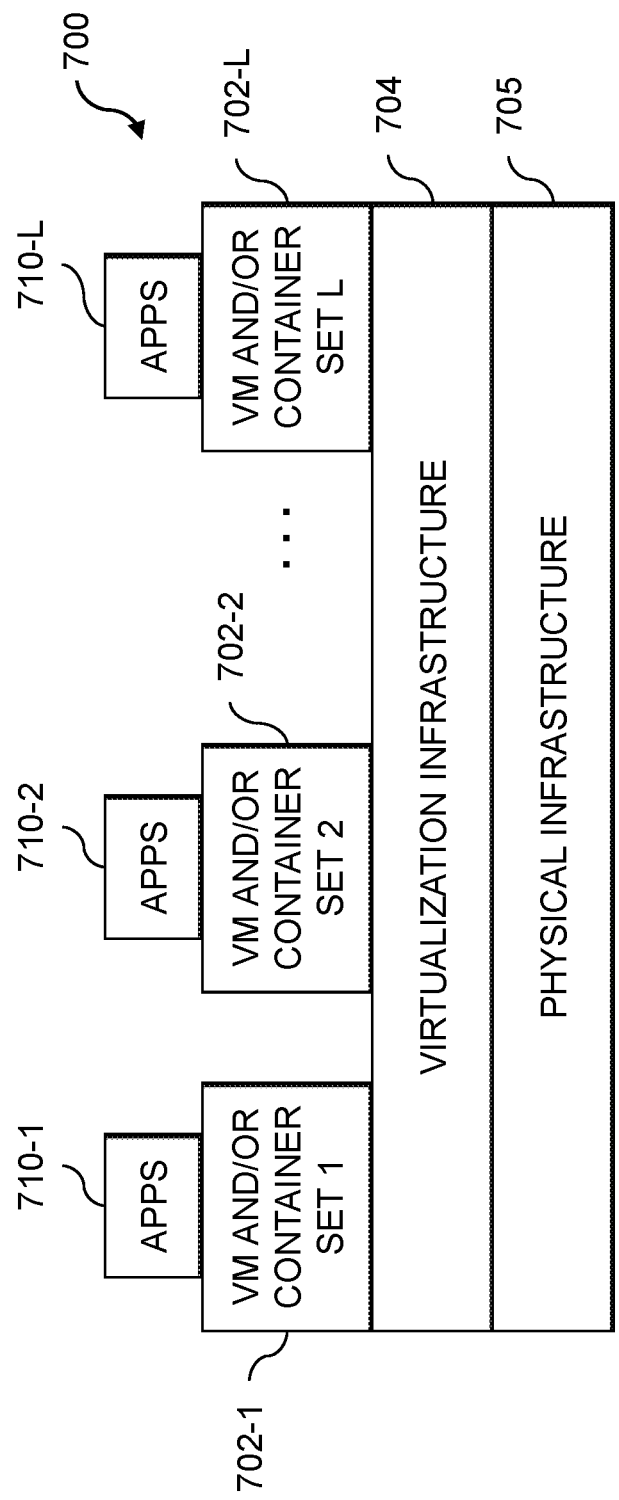
FIGS. 7 and 8 show examples of processing platforms that may be utilized to implement at least a portion of an information processing system in illustrative embodiments.
Figure 8:
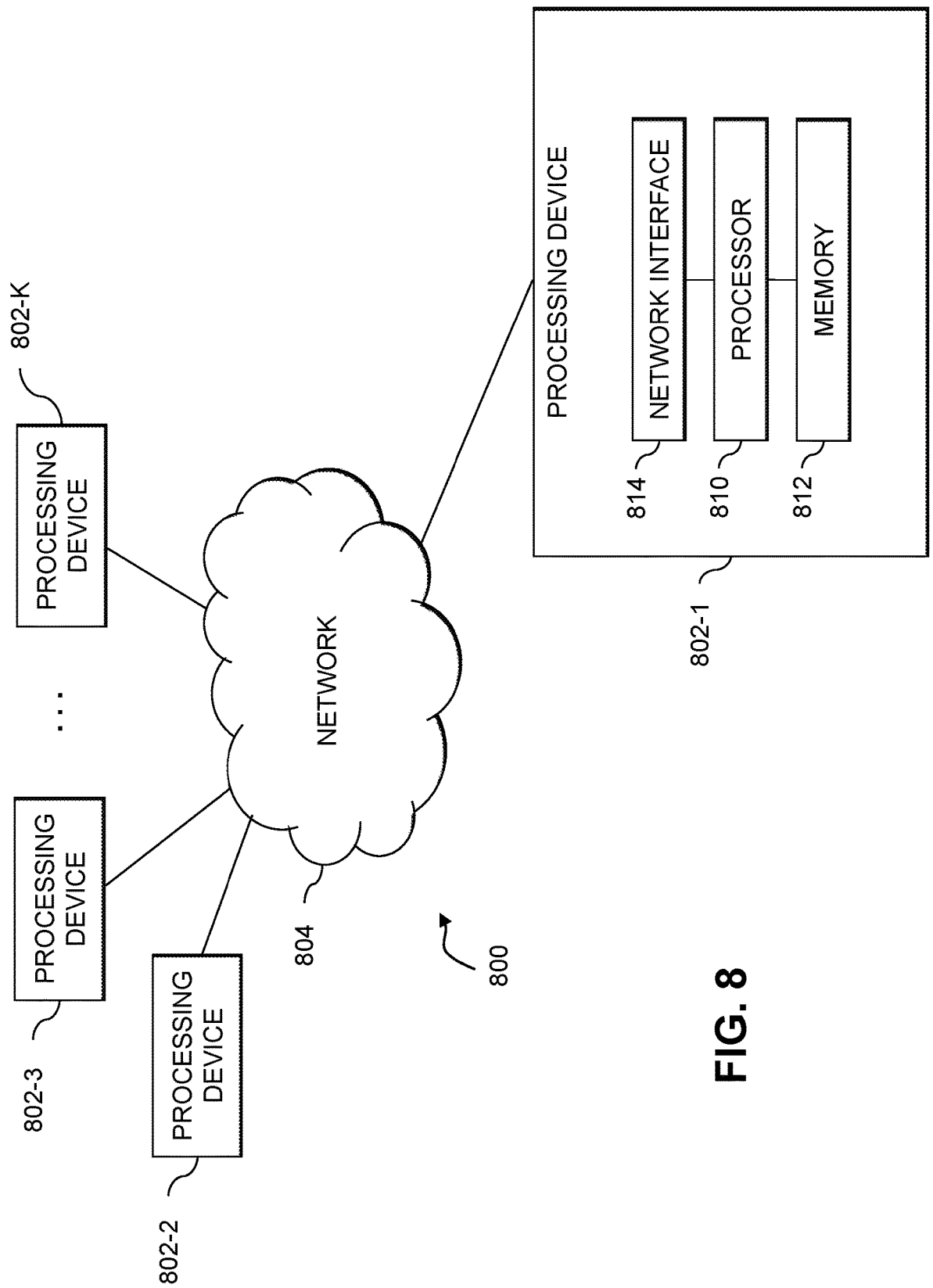

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2, ... 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, ... 710-L running on respective ones of the VMs/container sets 702-1, 702-2, ... 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, ... 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for reducing power consumption of a data center while maintaining specified performance benchmarks utilizing a reinforcement learning framework as disclosed herein are illustratively implemented in the form of software running on one or more processing devices.

It should again be emphasized that the above-described embodiments are presented for purposes of illustration only.

Many variations and other alternative embodiments may be used. For example, the disclosed techniques are applicable to a wide variety of other types of information processing systems, data centers, cooling systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   obtaining a first set of parameters characterizing an operating state of a plurality of heterogeneous information technology resources of a data center and a second set of parameters characterizing an operating state of one or more cooling systems of the data center;
   determining an overall operating state of the data center by aggregating the first and second sets of parameters;
   identifying a power consumption profile of the data center based at least in part on the determined overall operating state of the data center;
   performing a joint training of a first set of one or more reinforcement learning agents and a second set of one or more reinforcement learning agents based at least in part on the determined overall operating state of the data center and the identified power consumption profile;
   generating a first set of controls for the plurality of heterogeneous information technology resources of the data center utilizing the trained first set of one or more reinforcement learning agents and a second set of controls for the one or more cooling systems of the data center utilizing the trained second set of one or more reinforcement learning agents, the first and second sets of controls being configured to reduce power consumption by the data center while maintaining specified performance benchmarks for workloads executing in the data center; and
   controlling operation of the data center based at least in part on the first and second sets of controls.

2. The apparatus of claim 1 wherein the first set of parameters comprises telemetry information obtained from the plurality of heterogeneous information technology resources of the data center, the telemetry information comprising:
   temperature measurements for one or more hardware components of each of the plurality of heterogeneous information technology resources for a given period of time; and
   power consumption measurements for each of the plurality of heterogeneous information technology resources for the given period of time.

3. The apparatus of claim 1 wherein the first set of parameters comprises resource management information obtained from the plurality of heterogeneous information technology resources of the data center, the resource management information comprising two or more of:
   average central processing unit (CPU) speed measurements for each of the plurality of heterogeneous information technology resources for a given period of time;
   CPU load measurements for each of the plurality of heterogeneous information technology resources for the given period of time;
   average uptime measurements for each of the plurality of heterogeneous information technology resources for the given period of time; and
   average memory measurements for each of the plurality of heterogeneous information technology resources for the given period of time.

4. The apparatus of claim 1 wherein the first set of parameters comprises task management information for a plurality of workloads scheduled for execution on the plurality of heterogeneous information technology resources of the data center, the task management information comprising two or more of:
   expected central processing unit (CPU) requirements for at least a subset of the plurality of workloads scheduled for execution on the plurality of heterogeneous information technology resources for a given upcoming period of time;
   expected memory requirements for at least a subset of the plurality of workloads scheduled for execution on the plurality of heterogeneous information technology resources for the given upcoming period of time;
   expected time for completion for at least a subset of the plurality of workloads scheduled for execution on the plurality of heterogeneous information technology resources;
   a most recent wait time for the plurality of workloads scheduled for execution on the plurality of heterogeneous information technology resources; and
   a most recent execution time for the plurality of workloads scheduled for execution on the plurality of heterogeneous information technology resources.

5. The apparatus of claim 1 wherein the second set of parameters comprise telemetry information obtained from the one or more cooling systems, the telemetry information comprising two or more of:
   air flow measurements for each of a plurality of air conditioning units of the one or more cooling systems for a given period of time;
   input temperature measurements for each of the plurality of air conditioning units of the one or more cooling systems for the given period of time;
   output temperature measurements for each of the plurality of air conditioning units of the one or more cooling systems for the given period of time; and
   power consumption measurements for each of the plurality of air conditioning units of the one or more cooling systems for the given period of time.

6. The apparatus of claim 1 wherein obtaining the first and second sets of parameters, determining the overall operating state of the data center, identifying the power consumption profile, generating the first and second sets of controls, and controlling operation of the data center are performed for each of two or more time periods, each of the two or more time periods being associated with a change in the operating state of the plurality of heterogeneous information technology resources of the data center.

7. The apparatus of claim 6 wherein the change in the operating state of the plurality of heterogeneous information technology resources of the data center comprises at least one of:

arrival of one or more new workloads in a queue of workloads to be scheduled on the plurality of heterogeneous information technology resources of the data center; and completion of one or more workloads currently operating on one or more of the plurality of heterogeneous information technology resources of the data center.

8. The apparatus of claim 1 wherein identifying the power consumption profile comprises identifying a joint reward characterizing power consumption by the data center as a weighted summation of reward components identified from the first and second sets of parameters.

9. The apparatus of claim 8 wherein the weighted summation comprises reward components for:

at least one of central processing unit (CPU) speed measurements, CPU load measurements, uptime measurements and memory measurements for the plurality of heterogeneous information technology resources in the first set of parameters;

at least one of a most recent wait time and a most recent execution time for workloads scheduled for execution on the plurality of heterogeneous information technology resources in the first set of parameters;

power consumption measurements for the plurality of heterogeneous information technology resources in the first set of parameters; and power consumption measurements for each of a plurality of air conditioning units of the one or more cooling systems in the second set of parameters.

10. The apparatus of claim 1 wherein the first set of controls comprises identification of workloads to be assigned to respective ones of the plurality of heterogeneous information technology resources for execution in an upcoming period of time.

11. The apparatus of claim 1 wherein the second set of controls comprises temperature setpoint information for each of a plurality of air conditioning units of the one or more cooling system for an upcoming period of time.

12. The apparatus of claim 1 wherein jointly training the first and second sets of one or more reinforcement learning agents comprises utilizing a Multi-Agent Deep Deterministic Policy Gradient algorithm.

13. The apparatus of claim 12 wherein jointly training the first and second sets of one or more reinforcement learning agents comprises computing updated weights for respective ones of the first and second sets of one or more reinforcement learning agents based at least in part on information stored in a training data buffer, the information stored in the training data buffer comprises a set of tuples each comprising:

a first overall operating state of the data center for a first time period;

first and second sets of controls generated utilizing the first and second sets one or more reinforcement learning agents for the first time period;

a power consumption profile for the first time period; and a second overall operating state of the data center for a second time period subsequent to the first time period.

14. The apparatus of claim 13 wherein generating the first and second sets of controls comprises:

combining the computed updated weights with existing weights for the first and second sets of one or more reinforcement learning agents; and performing inference utilizing the first and second sets of one or more reinforcement learning agents with the combined weights.

15. A computer program product comprising a non-transitory processor-readable storage medium having stored therein program code of one or more software programs, wherein the program code when executed by at least one processing device causes the at least one processing device to perform steps of:

obtaining a first set of parameters characterizing an operating state of a plurality of heterogeneous information technology resources of a data center and a second set of parameters characterizing an operating state of one or more cooling systems of the data center;

determining an overall operating state of the data center by aggregating the first and second sets of parameters;

identifying a power consumption profile of the data center based at least in part on the determined overall operating state of the data center;

performing a joint training of a first set of one or more reinforcement learning agents and a second set of one or more reinforcement learning agents based at least in part on the determined overall operating state of the data center and the identified power consumption profile;

generating a first set of controls for the plurality of heterogeneous information technology resources of the data center utilizing the trained first set of one or more reinforcement learning agents and a second set of controls for the one or more cooling systems of the data center utilizing the trained second set of one or more reinforcement learning agents, the first and second sets of controls being configured to reduce power consumption by the data center while maintaining specified performance benchmarks for workloads executing in the data center; and controlling operation of the data center based at least in part on the first and second sets of controls.

16. The computer program product of claim 15 wherein jointly training the first and second sets of one or more reinforcement learning agents comprises utilizing a Multi-Agent Deep Deterministic Policy Gradient algorithm.

17. The computer program product of claim 16 wherein jointly training the first and second sets of one or more reinforcement learning agents comprises computing updated weights for respective ones of the first and second sets of one or more reinforcement learning agents based at least in part on information stored in a training data buffer, the information stored in the training data buffer comprises a set of tuples each comprising:

a first overall operating state of the data center for a first time period;

first and second sets of controls generated utilizing the first and second sets one or more reinforcement learning agents for the first time period;

a power consumption profile for the first time period; and a second overall operating state of the data center for a second time period subsequent to the first time period.

18. A method comprising:

obtaining a first set of parameters characterizing an operating state of a plurality of heterogeneous information technology resources of a data center and a second set of parameters characterizing an operating state of one or more cooling systems of the data center;

determining an overall operating state of the data center by aggregating the first and second sets of parameters;

identifying a power consumption profile of the data center based at least in part on the determined overall operating state of the data center;

performing a joint training of a first set of one or more reinforcement learning agents and a second set of one or more reinforcement learning agents based at least in part on the determined overall operating state of the data center and the identified power consumption profile;

generating a first set of controls for the plurality of heterogeneous information technology resources of the data center utilizing the trained first set of one or more reinforcement learning agents and a second set of controls for the one or more cooling systems of the data center utilizing the trained second set of one or more reinforcement learning agents, the first and second sets of controls being configured to reduce power consumption by the data center while maintaining specified performance benchmarks for workloads executing in the data center; and controlling operation of the data center based at least in part on the first and second sets of controls;

wherein the method is performed by at least one processing device comprising a processor coupled to a memory.

19. The method of claim 18 wherein jointly training the first and second sets of one or more reinforcement learning agents comprises utilizing a Multi-Agent Deep Deterministic Policy Gradient algorithm.

20. The method of claim 19 wherein jointly training the first and second sets of one or more reinforcement learning agents comprises computing updated weights for respective ones of the first and second sets of one or more reinforcement learning agents based at least in part on information stored in a training data buffer, the information stored in the training data buffer comprises a set of tuples each comprising:

a first overall operating state of the data center for a first time period;

first and second sets of controls generated utilizing the first and second sets one or more reinforcement learning agents for the first time period;

a power consumption profile for the first time period; and a second overall operating state of the data center for a second time period subsequent to the first time period.

* * * * *